(12) United States Patent
Marcus (10) Patent No.: US 8,078,045 B2
(45) Date of Patent: *Dec. 13, 2011

(54) REMOTE VIEW AND CONTROLLER FOR A CAMERA

(75) Inventor: Brian I. Marcus, San Francisco, CA (US)

(73) Assignee: Forever Ventures LLC, Richardson, TX (US)

( * ) Notice: Subject to any disclaimer, the term of this patent is extended or adjusted under 35 U.S.C. 154(b) by 514 days.

This patent is subject to a terminal disclaimer.

(21) Appl. No.: 12/125,828

(22) Filed: May 22, 2008

(65) Prior Publication Data
US 2008/0240697 A1    Oct. 2, 2008

Related U.S. Application Data

(63) Continuation of application No. 11/189,359, filed on Jul. 26, 2005, now Pat. No. 7,379,664.

(51) Int. Cl.
*G03B 17/00* (2006.01)

(52) U.S. Cl. .................. 396/56; 348/211.8; 348/211.13; 375/240.01

(58) Field of Classification Search ............... 396/56, 396/58; 348/211.8, 211.13
See application file for complete search history.

(56) References Cited

U.S. PATENT DOCUMENTS

| | | | |
|---|---|---|---|
| 6,809,759 B1 * | 10/2004 | Chiang | 348/211.2 |
| 6,819,867 B2 * | 11/2004 | Mayer et al. | 396/56 |
| 7,379,664 B2 * | 5/2008 | Marcus | 396/56 |
| 7,755,668 B1 * | 7/2010 | Johnston et al. | 348/211.4 |
| 2003/0165192 A1 * | 9/2003 | Kitta | 375/240.01 |
| 2004/0135879 A1 * | 7/2004 | Stacy et al. | 348/14.02 |
| 2006/0114987 A1 * | 6/2006 | Roman | 375/240.01 |

* cited by examiner

*Primary Examiner* — Clayton E Laballe
*Assistant Examiner* — Warren Fenwick
(74) *Attorney, Agent, or Firm* — Brian I. Marcus (57) ABSTRACT

A device operable with a camera is disclosed which includes a display screen, remote from the camera, and a processor for receiving an image signal of the field of view of the camera and for displaying an image of the field of view of the camera on the display screen. The device communicates with and controls certain camera functions to allow a photographic or video image to be framed and taken from a location remote from the camera.

15 Claims, 10 Drawing Sheets

REMOTE VIEW AND CONTROLLER FOR A CAMERA

PRIORITY CLAIM

This application is a continuation of U.S. patent application Ser. No. 11/189,359 filed Jul. 26, 2005 entitled "Remote View And Controller For A Camera," which application has been allowed and is to issue as U.S. Pat. No. 7,379,664 on May 27, 2008.

BACKGROUND OF THE INVENTION

1. Field of the Invention

This invention relates generally to the field of photography, and in particular to a view and camera controller that is remote from the camera.

2. Description of the Related Art

Whether single lens reflex ("SLR") or digital formats, cameras have become common household items. Camera technology has evolved to the point where cameras fit within the palm of a hand and may be easily and conveniently carried and accessed for taking photographs. However, a drawback to conventional cameras is typically a person needs to be behind a camera to line up the camera view, zoom to the proper perspective, frame the photo, and take the photo. Consequently that person may not be able to be in the photo.

In populated areas, this drawback is often overcome by imposing on strangers by asking them to take a photograph. In addition to the imposition, the stranger is often ill-equipped to operate the camera and/or take advantage of the various camera features. Similarly, the stranger may not understand what the photograph is to encompass as far as zoom and background.

Additionally, when in private, or in an otherwise unpopulated area, imposing on others to take the photograph may not be an option. In that instance, a person taking the photograph may not also be in the photograph. One solution to this problem is the inclusion of a timer in some cameras. In this instance, a person may set up the photograph view, zoom and frame, and then set a timer to give the individual time to move from behind the camera to be within the photograph. However, timers are still inconvenient to use, and the subject moving from behind the camera into the photo may not properly position themselves in the desired position within the photograph.

Mobile telephones, personal digital assistants and computers are also become household devices. Conventionally, mobile telephones and other devices have not been used to view an image seen by a camera, nor have mobile telephones and the like been used to control camera operation.

SUMMARY OF THE INVENTION

Embodiments of the present invention relate to a device operable with a camera, video camcorder, webcam, mobile telephone or other image-capturing device (all hereinafter referred to as a "camera"). The device includes a display screen, remote from the camera, and a processor for receiving an image signal of the field of view of the camera and for displaying an image of the field of view of the camera on the display screen. In embodiments, the device may communicate with an actuation table on which the camera is mounted for pivoting the actuation table and camera left and right and up and down to properly frame a photo or image being captured by the camera. In embodiments, the actuation table may be omitted and the camera itself responds electronically and/or mechanically to the communication from the device to properly frame the photo or image. The device may further include a zoom control for zooming the camera field of view in and out, as well as a button causing the camera to take a picture.

In embodiments, the device may be a dedicated component. In an alternative embodiment, the device may be a multipurpose device configured to receive and display an image from the camera field of view, and to control certain camera functions. Such multipurpose devices include but are not limited to a mobile telephone, a personal digital assistant, hand-held computer, laptop computer, desktop computer, a tablet computer and/or another camera.

BRIEF DESCRIPTION OF THE DRAWINGS

The present invention will now be described with reference to the drawings.

DETAILED DESCRIPTION

The present invention will now be described with reference to FIGS. 1 through 16, which embodiments of the present invention relate to a camera view and controller unit ("VCU"). It is understood that the present invention may be embodied in many different forms and should not be construed as being limited to the embodiments set forth herein. Rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
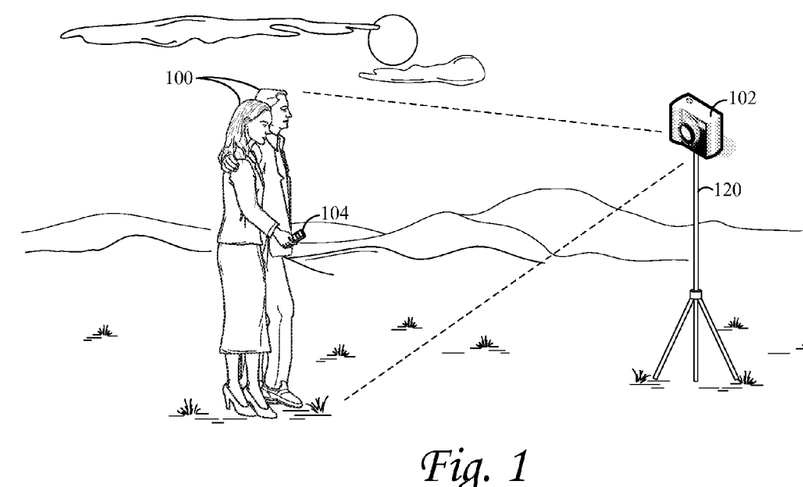
FIG. 1 is the perspective view of a camera taking a photograph with a remote view and control device according to embodiments of the invention.

Referring now to the perspective view of FIG. 1, there are shown subjects 100 in front of a camera 102. One of the subjects is holding a VCU 104 as explained hereinafter. Camera 102 may include any components known for inclusion in a camera, plus a communication system for communicating with VCU 104 as explained hereinafter. Camera 102 may be a digital camera, but it is contemplated that camera 102 is a SLR camera, video camcorder, webcam, mobile telephone or other image-capturing device in alternative embodiments. Camera 102 may operate with a flash, or not, and may have any known lens for use with cameras. Camera 102 may have a built in lens, or be configured to work with a variety of detachable lenses.

Figure 2:
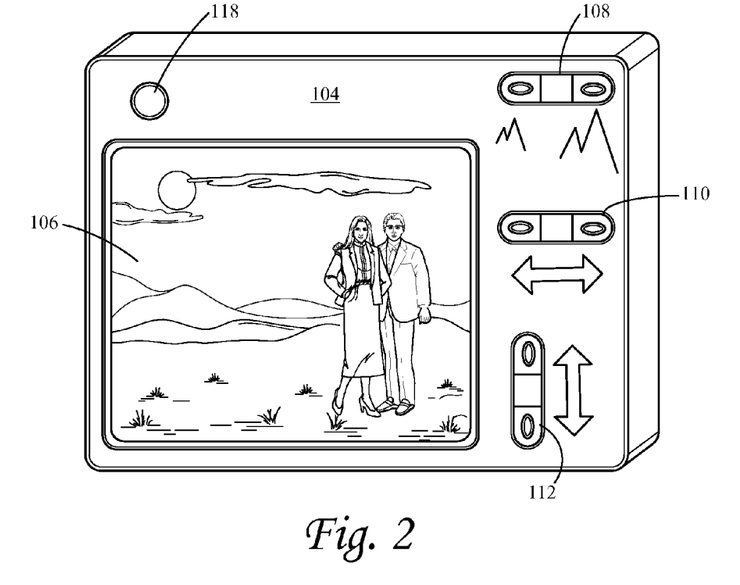
FIG. 2 is a front view of the view and control device according to embodiments of the invention.
Figure 3:
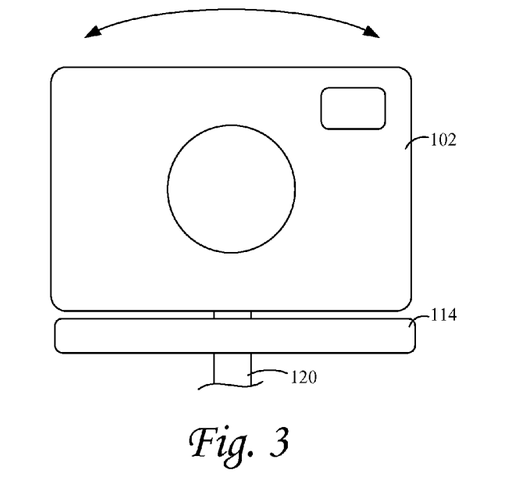
FIG. 3 is a front view of a camera and actuation table according to embodiments of the present invention.
Figure 4:
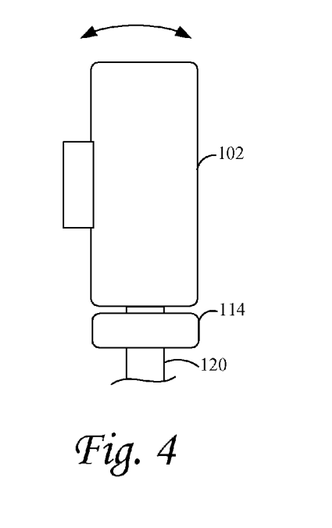
FIG. 4 is a side view of a camera and actuation table according to embodiments of the present invention.

Referring to FIGS. 1 and 2, VCU 104 allows a subject 100 to stand in front of camera 102, i.e., within the field of view of the camera, while at the same time viewing the camera field of view and controlling camera function and operation. In particular, VCU 104 may include an LCD screen 106 for showing the field of view seen by the camera, and zoom in/out pushbutton 108, pan left/right pushbutton 110 and pan up/down pushbutton 112. The buttons 108, 110 and 112 are provided for changing a perspective of the camera by zooming the camera lens in or out, tilting the camera left or right or tilting the camera up or down, respectively. The actions affected by each of the buttons 108, 110 and 112 are communicated to camera 102 via wireless protocols explained hereinafter.

VCU 104 may have a form factor so as to be held comfortably in a single hand, though the length, width and depth of the unit may vary in alternative embodiments. The VCU 104 may be approximately the same size or smaller than the camera 102. VCU may have an outer housing formed of metal, plastic of other durable, protective material.

When standing in front of the camera mounted on a tripod or otherwise supported on a surface, the camera's field of view may not be positioned as desired for a particular photograph or video image. It may be desired to tilt the camera left or right and/or up or down, so as to properly capture the subjects 100 as well as the desired background. Camera 102 may therefore be mounted on an actuation table 114 as shown for example in FIGS. 3 and 4. An embodiment of actuation table 114 is described hereinafter, but it is understood that a variety of mechanisms may be provided for pivoting camera 102 about two axes in order to tilt the camera left and right and up and down.

Conventional cameras may be mounted on a tripod 120 as shown in FIG. 1. Actuation table 114 may include an opening on its bottom surface to attach to the tripod in the same manner as camera 102 attaches to the tripod. For example, a bottom surface of actuation table 114 may include a threaded bore (not shown) for screwing onto tripod 120. It is understood that actuation table 114 may include any mounting scheme used to mount cameras to tripods.

Similarly, actuation table may include a vertical shaft 150 emanating from a top of the actuation table onto which the camera 102 may be affixed. Camera 102 may affix to vertical shaft 150 in the same manner as camera 102 affixes to tripod 120. For example, vertical shaft 150 may include a threaded end for mating within a threaded bore formed within a bottom surface of camera 102. It is understood that vertical shaft 150 may include any mounting scheme used to mount tripods to cameras.

Figure 5:
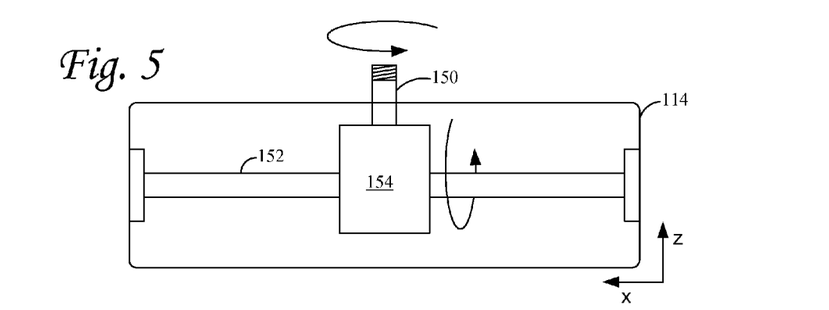
FIG. 5 is a front view of the interior of an actuation table according to embodiments of the present invention.
Figure 6:
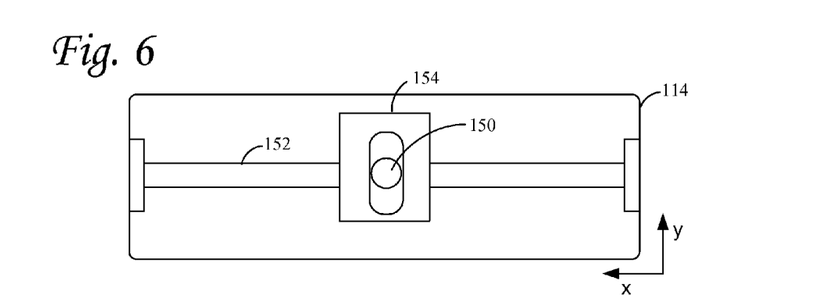
FIG. 6 is a top view of the interior of an actuation table according to embodiments of the present invention.
Figure 7:
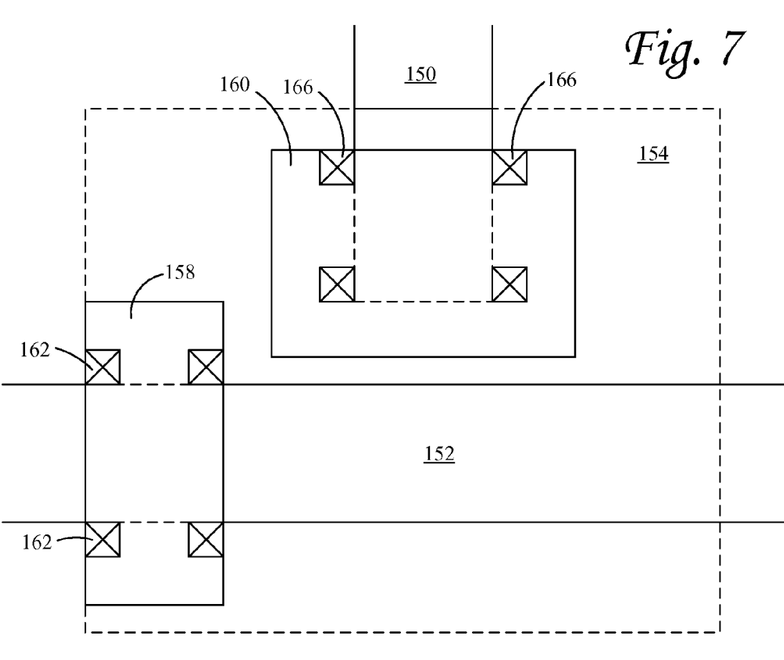
FIG. 7 is a front view of the interior of a drive housing according to embodiments of the present invention.

Internal components for pivoting camera 102 about two axes according to one embodiment are shown in FIGS. 5-7. Perpendicular x, y, z axes are indicated in FIGS. 5 and 6, with an x-y plane being a horizontal plane and z being a vertical axis (it is understood that the actuation table and camera 102 need not be mounted along these axes). Mounted on the bottom of camera 102 in an x-y plane, the actuation table is capable of pivoting camera 102 about the x axis to tilt camera 102 up and down, and about the z axis to tilt camera 102 left and right.

An embodiment of actuation table 114 includes a horizontal shaft 152 extending along the x-axis and fixedly mounted within the actuation table, to opposed internal ends of the actuation table. A drive housing 154 is pivotally mounted to horizontal shaft 152. Vertical shaft 150 is pivotally mounted within the drive housing and extends along the z-axis from the drive housing 154. Referring to FIG. 7, drive housing 154 includes an x-axis drive 158 and a z-axis drive 160. X-axis drive 158 may be a reversible motor of known construction, including bearings 162 for rotationally supporting x-axis drive 158 on horizontal shaft 152, and a stator for receiving an electric current. The horizontal shaft 152 may be a rotor running through the drive's stator. Upon current to the stator, x-axis drive 158 controllably pivots drive housing 154 about the x-axis, to tilt the actuation table 114 and camera 102 up or down.

Z-axis drive 160 may be a reversible motor of known construction, including bearings 166 for rotationally supporting vertical shaft 150 within drive housing 154, and a stator for receiving an electric current. The vertical shaft 150 may be a rotor running through the drive's stator. Upon current to the stator, z-axis drive 160 pivots vertical shaft 150 about the z-axis, to tilt the actuation table 114 and camera 102 left or right, independently of the x-axis drive 158.

Drive housing 154 may include a variety of other components in alternative embodiments. One or both of drives 158, 160 may additionally or alternatively include one or more gears or a planetary gear system to pivot the housing 154 and/or vertical shaft 150 about its respective axis. Drive housing may additionally include electromagnetic interference (EMI) shielding to shield the respective drives 158, 160 from each other. The size of the drives 158, 160 may vary in alternative embodiments of the invention.

Those of skill in the art would appreciate other drive mechanisms for achieving independent pivoting of camera 102 about the x and z axes. For example, it is contemplated that camera 102 be affixed to the actuation table with a ball and socket arrangement between the table and camera. The movement of the camera on the ball of the actuation table may be controlled with various drives and control mechanisms. While the embodiment of actuation table 114 may be mounted horizontally beneath camera 102, it is conceivable some manner of actuation table 114 may be mounted vertically to a vertical surface of camera 102. Again, various known drive mechanisms would be known to those of skill in the art for such an embodiment.

The present invention may operate without the tripod 120. In such an embodiment, a bottom portion of actuation table 114 may simply rest on an arbitrary surface selected by the subject. For such embodiments, the camera 102 may be mounted to the actuation table 114, and may pivot about a pair of axes, as described above.

The arbitrary surface selected by the user may not be flat. Therefore, in a further embodiment shown in FIG. 8, the actuation table may have an adaptive surface 180 on its lower surface. Adaptive surface 180 may have a shape capable of conforming to an arbitrary surface on which the actuation table and camera may be positioned. This allows the actuation table and camera to be supported on an arbitrary surface in a stable and controlled position. Adaptive surface 180 may for example be deformable, and have a plurality of beads within an interior cavity as is known in the art, which beads allow the surface 180 to adapt in shape to arbitrary surfaces. Other configurations for allowing a lower surface of actuation table 114 to conform to an arbitrary surface are known.

In a further embodiment, it is understood the actuation table 114 may be omitted. In such embodiments the camera 102 may be stationarily positioned on a tripod or an arbitrary surface. In such embodiments, the left/right and up/down fields of view may be set and do not change. Alternatively, the left/right and up/down fields may be adjusted electronically as explained hereinafter. Where the actuation table is omitted, the bottom portion of the camera may be supported directly on an arbitrary surface. Alternatively, the adaptive surface 180 may be provided on a bottom surface of camera 102 to support the camera in a stable and controllable position.

It is conceivable that, instead of an actuation table, camera 102 itself is capable of adjusting the field of view up or down and/or left or right. This can be accomplished optically, electronically, mechanically or some combination of optics, electronics, and mechanics. In a first embodiment, the camera may include a wide view lens that receives a wide view which is captured on the image sensor. The VCU is used to instruct the camera to adjust/shift the field of view in a particular direction (i.e., up or down, left or right, zoom in or out). The camera's optics and/or electronics cause the lens to refocuses as instructed by the VCU. The camera advantageously reallocates the image capturing elements (typically referred to as pixels) to capture the selected image with a high degree of clarity and focus.

In such embodiments, the VCU display 106 may display an image generally the size and composition of a photograph or video image if taken at that time. As indicated, the actual image capturing element may have captured a larger image than displayed. As the captured image is larger than the field of view image, the field of view of the image may be electronically adjusted/shifted up or down, left or right, or zoomed in or out using the actuators on the VCU 104.

Alternatively, the VCU display 106 may display the entire captured image, i.e., a larger view than the size of a photograph or video image. In such an embodiment, the display may further include a graphical rectangle or other visual indicator generally representing the boundary of a photograph or video image field of view if taken at that time. The position of the graphical rectangle can be adjusted/shifted up or down, left or right, or zoomed in or out on the display 106 using the actuators on the VCU 104 to electronically adjust/shift the field of view of the image up or down, left or right, or in or out.

In another embodiment, the camera may include additional image capturing elements that allows the camera's optics to capture a portion or portions of an image around the periphery of the camera's nominal field of view. As the VCU instructs the camera to adjust/shift in a particular direction (i.e., up, down, left or right, zoom in or out), the camera utilizes those additional image capturing elements to capture the portions of the images that are added as a result of the adjustment or shift.

In other embodiment, the camera may utilize the image capturing elements that become obsolete as a result of an instructed adjustment. As the VCU instructs the camera to adjust/shift in a particular direction (i.e., up, down, left, right, zoom in or out) and away from its nominal field of view, the camera's optics and microprocessor can advantageously utilize those image capturing elements that will become unused when the field of view adjust/shift in a particular direction to capture the portions of the images that are added as a result of the adjustment/shift.

It is understood that some combination of additional image capturing elements and obsolete image capturing elements may be use to achieve the design goals of the present invention.

Figure 8:
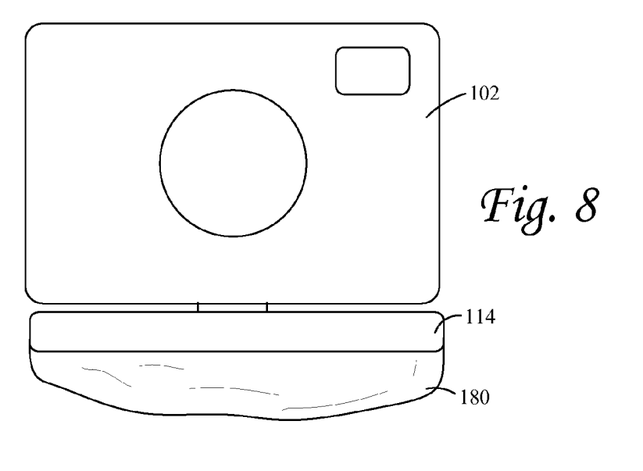
FIG. 8 is a front view of an embodiment of a support structure for use as an alternative to a tripod.
Figure 8A:
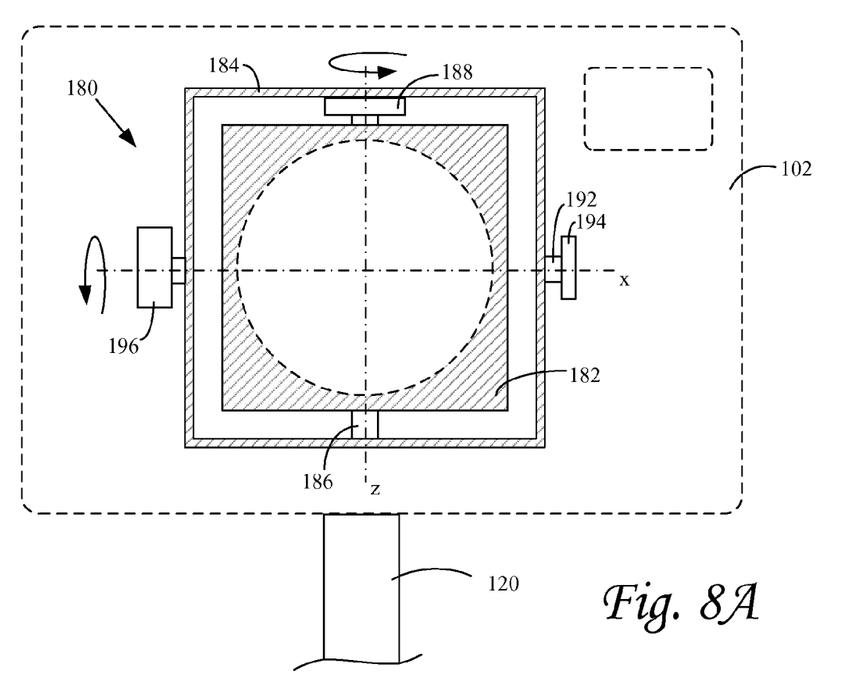
FIGS. 8A and 8B are views of a camera having a lens capable of left/right tilt and/or up/down tilt relative to a camera housing in which the lens is supported.
Figure 8B:
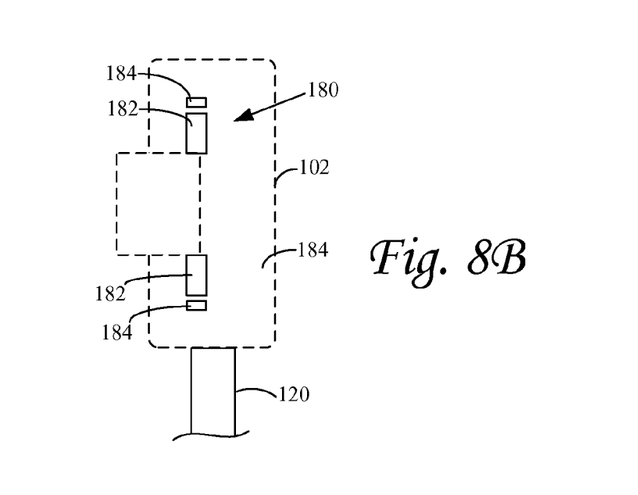

In another embodiment, motors may be used. For example, a lens capable of left/right tilt and/or up/down tilt relative to a camera housing in which the lens is supported. An example of such an embodiment is shown in FIGS. 8A and 8B. In FIGS. 8A and 8B, the camera and lens are shown in phantom for clarity of a lens actuation assembly 180. Lens actuation assembly 180 may include a plate 182 with an aperture for detachably receiving the camera lens. Plate 182 may be pivotally mounted to a frame 184 via a shaft 186 so as to pivot around the z-axis. The shaft 186 may be pivotally mounted within a reversible drive 188 to controllably affect rotation of the plate 182 and the camera lens about the z-axis to tilt the lens left and right relative to the camera housing 190.

The frame 184 is in turn fixedly mounted to a shaft 192 pivotally mounted within housing 190 to a support 194 at one end and a second reversible drive 196 mounted to the housing 190 at its opposite end. The reversible drive 196 controllably affects rotation of shaft 192, frame 184 and the camera lens about the x-axis to tilt the lens up and down relative to the camera housing 190. Those of skill in the art would appreciate other assemblies for tilting the lens with respect to the camera housing.

Referring again to FIG. 2, VCU 104 may include zoom pushbutton 108, left/right pushbutton 110 and up/down pushbutton 112. Upon actuation of pushbutton 108, a signal may be sent to camera 102 as explained hereinafter to elongate or shorten the position of the camera lens to affect a zoom in or zoom out of the field of view. Apart from the manner in which the signal may be sent to affect a lens zoom, the pushbutton 108 may operate in the same manner as the zoom button on a conventional camera.

Upon actuation of pushbutton 110, a signal may be sent to actuation table 114 as explained hereinafter actuating z-axis drive 160 to tilt the actuation table 114 and camera 102 left or right. Pushing on the left side of pushbutton 110 may tilt the camera to left, and pushing on the right side of pushbutton 110 may tilt the camera to the right. These directions may be reversed in alternative embodiments. The pushbutton 110 may be selectively actuated until the desired left/right field of view is captured by the camera 102.

Similarly, upon actuation of pushbutton 112, a signal may be sent to actuation table 114 as explained hereinafter actuating x-axis drive 158 to tilt the actuation table 114 and camera 102 up or down. Pushing on the top side of pushbutton 112 may tilt the camera up, and pushing on the bottom side of pushbutton 112 may tilt the camera down. These directions may be reversed in alternative embodiments. The pushbutton 112 may be selectively actuated until the desired up/down field of view is captured by the camera 102.

While pushbuttons are shown, those of skill in the art would appreciate that the above described functions of pushbuttons 108-112 may be accomplished by various other mechanisms, such as dials, slide levers, switches, other types of buttons, etc.

In conventional cameras, a field of view image as seen by a camera is transmitted and displayed on an LCD screen on a back side of the camera. As explained hereinafter, this same field of view image is transmitted to VCU 104 and displayed on LCD 106. Thus, in embodiments, the LCD screen 106 on VCU 104 shows the same image as shown on the LCD screen on the back of the camera. As the field of view image of the camera is adjusted by pushbuttons 108, 110 and/or 112 as explained above, the image shown on LCD 106 changes accordingly.

Once the proper zoom, left/right pan and up/down pan has been selected for a photo, as shown by the field of view displayed on LCD screen 106, a button 118 on VCU 104 may be actuated to send a signal to camera 102 to take a picture (i.e., capture the image shown on LCD screen 106 and save to memory). It is known that the lens may be autofocused on an image seen by the lens upon partially depressing the picture-taking button in a conventional camera. In the same manner, partially depressing button 118 may send a signal to the camera 102 causing the lens to autofocus on the image seen by the camera 102.

Those of skill in the art will appreciate that the arrangement of components 106, 108, 110, 112 and 118 on VCU 104 shown in FIG. 2 is one of many possible arrangement of those components on VCU 104. VCU 104 includes a back surface (not shown), opposite the surface shown in FIG. 2. The back surface may be blank, or may include an inscription, corporate logo or a plurality of aesthetic designs. Alternatively, one or more of the buttons 108, 110, 112 and 118 may be provided on the back surface, or on one of the edges between the front and back surface, in alternative embodiments.

Figure 9:
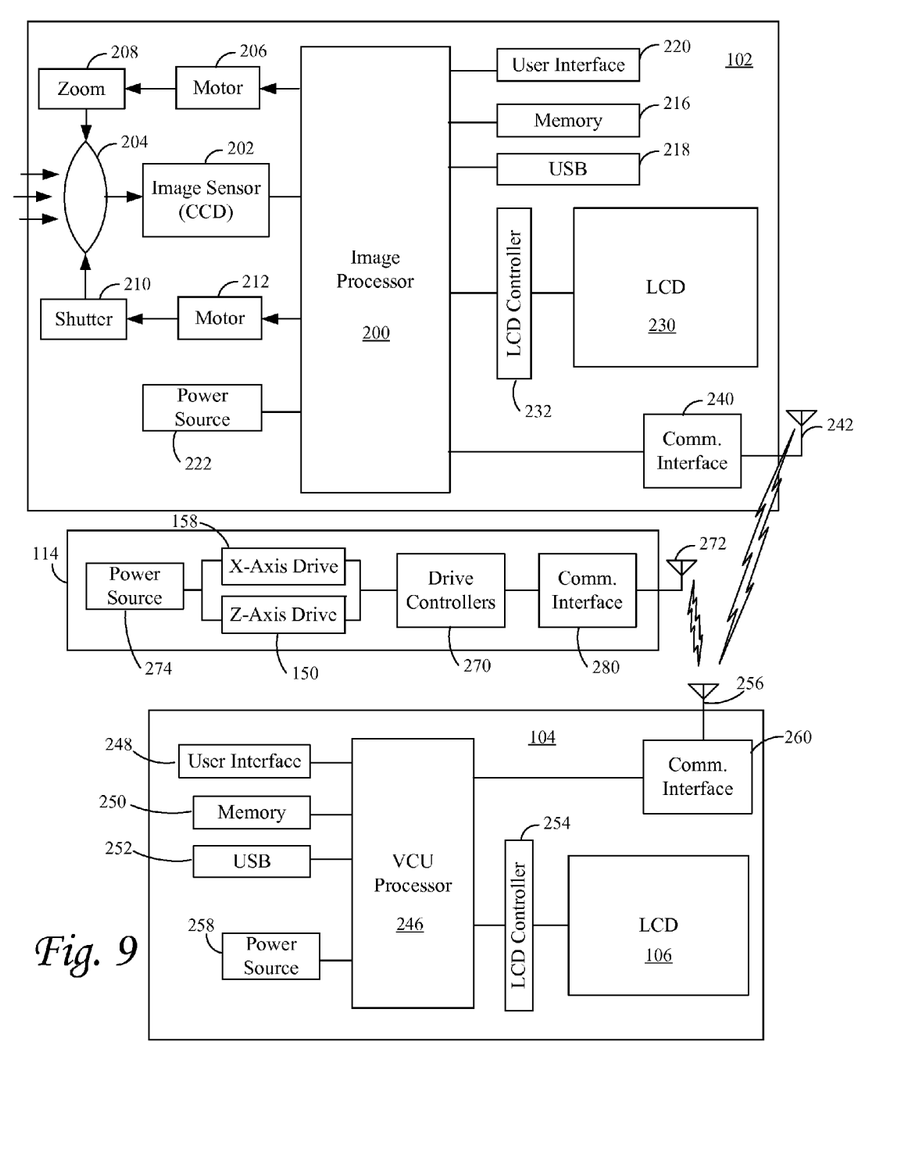
FIG. 9 is a block diagram of a camera, actuation table and view and control unit according to embodiments of the present invention.

FIG. 9 is a block diagram of a camera 102, actuation table 114 and VCU 104 according to an embodiment of the present invention. FIG. 9 shows an embodiment of the invention where camera 102 is a digital camera, and includes components provided within a conventional digital camera. FIG. 9 is a simplified block diagram of components within the camera 102, and it is understood that a variety of other components found within conventional digital cameras may be provided in addition to or instead of some of the components shown within camera 102 in alternative embodiments.

However, in general, digital camera may include an image processor 200 which receives image data from an image sensor 202, which captures an image through a lens 204. Image sensor 202 may be a charge coupled device (CCD) capable of converting light into an electric charge. Other devices, including complementary metal oxide semiconductor (CMOS) sensors, may be used for capturing information relating to an image. An analog-to-digital converter (not shown) may be employed to convert the data collected by the sensor 202. The zoom for the image is controlled by a motor 206 and zoom 208 in a known manner upon receipt of a signal from the processor 200. The image may be captured by the image sensor upon actuation of the shutter 210 via a motor 212 in a known manner upon receipt of a signal from the processor 200.

Images captured by the image sensor 202 may be stored by the image processor 200 in memory 216. A variety of digital memory formats are known for this purpose. In one embodiment, memory 216 may be a removable flash memory card, such as those manufactured by SanDisk Corporation of Sunnyvale, California. Formats for memory 216 include, but are not limited to: built-in memory, Smart Media cards, Compact Flash cards, Memory Sticks, floppy disks, hard disks, and writeable CDs and DVDs.

A USB connection 218 may be provided for allowing connection of the camera 102 to another device, such as for example a computer. It is understood that other types of connections may be provided, including serial, parallel, SCSI and an IEEE 1394 ("Firewire") connections. The connection 218 allows transfer of digital information between the memory 216 and another device. The digital information may be digital photographs, video images, or software such as application programs, application program interfaces, updates, patches, etc.

A user interface 220 of known design may also be provided on camera 102. The user interface may include various buttons, dials, switches, etc. for controlling camera features and operation. The user interface may include a zoom button or dial for affecting a zoom of lens 204 via the image processor 200. The user interface 220 may further include a mechanism for selecting a mode of operation of the camera 102 (i.e., stored picture review mode, picture taking mode, video mode, autofocus, manual focus, flash or no flash, etc.). The user interface may also cause various menu items to be displayed on LCD screen 230 described hereinafter for controlling camera functions such as deleting stored photos, changing picture resolution, etc.).

The image captured by the image sensor 202 may be forwarded by the image processor 200 to an LCD 230 positioned on the camera 102 via an LCD controller interface 232. LCD 230 and LCD controller 232 are known in the art. The LCD controller interface 232 may be part of processor 200 in embodiments.

Camera 102 further includes a communications interface 240 for transmitting signals between camera 102 and VCU 104. The interface 240, and complimentary communications interface 260 on VCU 104 and communications interface 280 on actuation table 114, may operate according to a variety of known wireless communication protocols for wirelessly communicating signals between camera 102, actuation table 114 and VCU 104.

In an embodiment, the wireless communication protocol may be the Bluetooth short-range wireless protocol which uses radio waves to allow local connectivity between the camera 102, actuation table 114 and VCU 104 in an ad hoc wireless network. The Bluetooth protocol operates using radio waves in the 2.45 GHz frequency band (the Industrial-Scientific-Medical (ISM) band). The Bluetooth consortium of companies also developed de facto standards for the interface and the software that controls it to ensure interoperability of devices from different manufacturers that are using Bluetooth communications. Further details of the Bluetooth communications system are set forth in the papers, "Ericsson's Bluetooth Modules," by Arfwedson and Sneddon, Ericsson Review No. 4, 1999, pp. 198-205, and "Bluetooth—The Universal Radio Interface for Ad Hoc, Wireless Connectivity," by Jaap Haartsen, Ericsson Review No. 3, 1998, pp. 110-117, which papers are incorporated by reference in their entirety herein. Further details relating to the Bluetooth communications system may also be found in the Bluetooth Specification at the Bluetooth website (www.bluetooth.com), which specification is also incorporated by reference in its entirety herein. Bluetooth has been shown capable of transmitting images. For example, Error Resilient Image Transmission over a Bluetooth Network, by Kelly et al., NUI, GALWAY FACULTY OF ENGINEERING RESEARCH DAY 2004, which is also incorporated by reference in its entirety herein, describes one methodology.

Communications interface 240 sends and receives transmissions via an antenna 242. Through communications interface 240, the image that the image processor 200 sends to the LCD controller 232 for display on LCD 230 may also be sent wirelessly to the VCU 104 for display on LCD 106. Thus, the image seen by the camera lens 204 to be captured in a photograph or video is seen on LCD 106 on VCU 104.

Image processor 200 may be configured to automatically send the image signal of the image seen by lens 204 to the VCU 104 when camera 102 is in use. Alternatively, once the VCU 104 is active, the VCU 104 may send a VCU present signal to the image processor 200 in camera 102, whereupon the image processor 200 may send the image signal to the VCU 104. When communicating with the VCU, the image processor 200 may send the image signal only to the VCU (so that the LCD 230 on camera 102 is inactive), or the image processor 200 may send the image signal to both the VCU 104 and the LCD 230.

Similarly, the communications interface 240 allows the camera 102 to receive transmissions from the VCU 104 via the communications interface 240. For example, signals initiated in the VCU 104 for zooming in and out, and for snapping a photo may be received wirelessly in image processor 200 via the communications interface 240.

While interaction and communications with VCU 104 are carried out in camera 102 by image processor 200, it is understood that image processor 200 may handle only camera functions, and interaction and communication with VCU 104 be carried out by a second processor within camera 102. Such a second processor would cooperate and communicate with image processor 200 to communicate the image signal to VCU 104 and communicate control signals from the VCU 104 to camera 102.

While embodiments of the invention operate according to the Bluetooth specification, it is understood that the communications interfaces in the camera 102, VCU 104 and actuation table 114 may operate according to other wireless protocols, such as for example Wireless USB, 802.11, radio frequency (RF), infrared (IR), IrDA from the Infrared Data Association and home RF technologies. Typically, as the camera 102 is taking a picture of the person holding the VCU 104, a clear line of sight may be established between the camera 102 and VCU 104.

The wireless signals sent via the various communications interfaces described herein may be sent via various protocols, including pulse modulation and quadrature amplitude modulation (QAM). Other protocols are contemplated. In embodiments, a first camera 102 and VCU 104 set may be used in the presence of other camera 102 and VCU 104 sets. Therefore, in embodiments, during a configuration process, the camera 102 and VCU 104 may be tuned to each other, i.e., communications between camera 102 and VCU 104 may be tuned to a particular frequency. In embodiments, the tuning step may be omitted and communications would occur at a set frequency.

Camera 102 may further include a power source 222, such as a rechargeable battery as is known in the art.

It is understood that not all of the conventional components necessary or optionally included for conventional operation of camera 102 are described above. Other components, known in the art, may additionally or alternatively be included in camera 102.

VCU 104 may include a VCU processor 246 for controlling operation of the VCU 104 and for communicating with camera 102 and actuation table 114. Processor 246 may include any of various known configurations, and may be implemented in hardware, software (firmware) or a combination of hardware and software. The processor may have an associated read-only memory (ROM) (not shown) for storing a software operating system and other software. The processor may additionally have an associated volatile memory (not shown), such as random access memory (RAM) and/or dynamic random access memory (DRAM) to use as temporary storage during operation of the VCU 104.

VCU Processor 246 may communicate with a user interface 248, including pushbuttons 108-112 and 118 described above. User interface 248 may optionally include a variety of other buttons, dials, switches, etc. for controlling camera features and operation. The user interface 248 may include a mechanism for selecting a mode of operation of the camera 102. Depending on the mode of operation selected, the VCU 104 may be used to review pictures stored on camera 102 or in memory 250 in VCU 104 (explained hereinafter), or it may be used to take pictures as explained above. A video mode may be provided such that, upon actuation of button 118 on VCU 104, the camera 102 captures a video image which may be stored in memory 216 on camera 102 and/or memory 250 in VCU 104. The user interface may further have mechanisms for selecting camera modes such as autofocus, manual focus, flash or no flash, etc. The user interface 248 may also cause various menu items to be displayed on the VCU LCD screen 106 for controlling camera and VCU functions, such as deleting stored photos (from camera 102 and/or VCU 104), changing picture resolution, etc.

For the manual focus mode, the user interface 248 may further include an actuator, such as a dial, which, when rotated on VCU 104, changes the focal length between the lens 204 and the image sensor 202 in camera 102 to focus the image. The actuator may for example be a dial mounted on a surface of VCU 104 opposite LCD screen 106, and may be sized to emulate the size of an annular lens assembly mounted in camera 102.

The user interface may further include a keypad for entering textual and other character information, which information may be saved with an associated image. This textual information may be used in the operation of VCU 104 or camera 102, or may be transmitted to a remote location as explained hereinafter. The user interface may further include pointing device, such as a track ball, for controlling a cursor which may be graphically presented on LCD 106 in certain modes of operation.

In embodiments, the VCU 104 controls camera 102 to take a picture which is then stored on camera 102. In addition to storing the image on camera 102, the image captured by the camera 102 may also be stored on memory 250 in VCU 104. A variety of digital memory formats may be used for this purpose. In one embodiment, memory 250 may be a removable flash memory card, such as those manufactured by SanDisk Corporation of Sunnyvale, Calif. Formats for memory 250 include, but are not limited to: built-in memory, Smart Media cards, Compact Flash cards, Memory Sticks, floppy disks, hard disks, and writeable CDs and DVDs.

VCU 104 may be coupled to another device, such as a computer, to transfer data, such as photograph and video images stored on memory 250, as well as software application programs, application program interfaces and updates. A USB connection 252 may be provided for this purpose. It is understood that other types of connections may be provided, including serial, parallel, SCSI and an IEEE 1394 ("Firewire") connections. The connection 252 may be used to connect the VCU to further devices in alternative embodiments.

As indicated above, the images received in lens 204 may be digitized and forwarded to the image processor 200, from where the digitized image may be sent as an image signal via the communications interfaces 240, 260 to LCD 106 on VCU 104. An LCD controller interface 254 may be provided for receiving the signal from image processor 200 and interpreting it for display on LCD 106. LCD 106 and LCD controller 254 may be of known construction. The LCD controller interface 254 may be part of processor 246 in embodiments.

As indicated above, VCU 104 may further include a communications interface 260 that sends and receives transmissions via an antenna 256. Actuation of the buttons 108 and 118, as well as other mechanisms provided as part of user interface 248, generates signals that are sent to the VCU processor 246, which in turn forwards those signals to image processor 200 in camera 102 via the communications interfaces 260 and 240. Similarly, actuation of the buttons 110 and 112 generates signals that are sent to the VCU processor 246, which in turn forwards those signals to drive controller(s) 270 in actuation table 114 as explained hereinafter via the communications interfaces 260 and 280.

Moreover, communications interface 260 may send and receive transmissions to/from components other than camera 102 and actuation table 114 in embodiments of the invention. For example, the VCU 104 may communicate with a host computer to transfer data, such as photographic and video images, as well as software such as application programs, APIs, updates, patches, etc. Communications interface 260 may also be used to communicate with other devices, such as a variety of computing devices including hand-held computers, personal digital assistants (PDAs), mobile telephones, digital cameras and other view and control units 104. Communications interface 260 may be used to connect VCU 104 to a variety of networks, including local area networks (LANs), wide area networks (WANs) and the Internet.

Thus, in embodiments of the invention, a photographic or video image may be taken with camera 102, and immediately thereafter sent via the communications interface 260 to a remote processing device, website, email account or other network location. Text may also be sent via the keypad of the user interface 248.

Embodiments have been described above where communication between VCU 104, camera 102 and actuation table 114 is done wirelessly. In a further embodiment of the invention, it is understood that the VCU 104 and camera 102, VCU 104 and actuation table 114, and/or camera 102 and actuation table 114 may be joined together by one or more electrical wires and/or cables. In such embodiments, transmissions between the VCU 104, camera 102 and/or actuation table 114 may be carried out via the electrical wires and/or cables. The wires and cables may connect to connector 252 on VCU 104.

VCU 104 may further include a power source 258, such as a rechargeable battery as is known in the art. Moreover, VCU 104 may include a power up/power down switch (not shown) for activating and shutting down the VCU 104.

Actuation table 114 may be used in certain embodiments of the present invention to control at least portions of a field of view of camera 102. Signals generated by actuation of pushbuttons 110, 112 are sent from the VCU processor 246 through communications interface 260 to actuation table 114 via communications interface 280 and an associated antenna 272. Transmissions received in communication interface 280 are forwarded to drive controller(s) 270 which control the operation of the x-axis drive 158 and z-axis drive 160 explained above in a known manner.

Actuation table 114 may further include a power source 274, such as a rechargeable battery as is known in the art. Alternatively, the actuation table 114 may be electrically coupled to camera 102 when the camera and actuation table are affixed together. In such embodiments, the actuation table power source 274 may be omitted, and the actuation table instead receive power from the camera power source 222.

In embodiments where actuation table 114 is electrically coupled to the camera 102, communication interface 280 on the actuation table 114 may be omitted, and all signals for actuating actuation table 114 be received from the VCU 104 though the camera 102. In a further alternative embodiment where actuation table 114 is electrically coupled to the camera 102, communication interface 240 on the camera 102 may be omitted, and all signals for the camera 102 may be received from the VCU 104 though actuation table 114.

In embodiments not including an electrical coupling of actuation table and camera 102, all signals from VCU 104 may go first to camera 102, which in turn forwards the signals to actuation table 114, via the various communications interfaces. Similarly, in embodiments not including an electrical coupling of actuation table and camera 102, all signals from VCU 104 may go first to actuation table 114, which in turn forwards the signals to camera 102, via the various communications interfaces.

It is understood that actuation table 114 may be omitted in alternative embodiments.

The VCU 104 may have a variety of shapes, sizes and configurations, including a display and one or more actuators for framing the field of view of an image, actuating the camera shutter, and/or performing a variety of other camera functions. VCU 104 need not be hand-held in embodiments. It may have straps and attach to a wearer's wrist, head, waist, other body parts or otherwise as an appurtenance to the wearer's body.

In operation, the VCU 104 may be held by a subject in the field of view of the camera 102, as shown in FIG. 1, and the VCU 104 operated to frame the camera field of view as desired (left/right pan, up/down pan, in/out zoom). Once the proper field of view is established, the subject may hide the VCU 104 or place the VCU in a pocket, or otherwise out of the field of view of the camera 102 so that the VCU 104 does not appear in the photo. A preset or user-configurable time delay may be provided so that a picture is taken a predetermined period of time after button 118 on VCU 104 is pressed. Thus, the subject would have time to locate the VCU 104 out of the field of view. The time delay may be set by the user interface 248 on the VCU 104 and/or on the user interface 220 on the camera 102. The time delay may be omitted in alternative embodiments, and the picture taken immediately upon actuation of button 118.

In an alternative embodiment, the VCU 104 may be held and operated by an operator who is not to be in the picture. The VCU 104 may be used for example by a photographer lining up and setting the scene of a photograph. Thus, the photographer need not walk back and forth between the subjects/subject matter of the photo and the viewfinder behind the camera.

Moreover, the present invention may be used to obtain a view from a camera not otherwise obtainable if the camera needed to be positioned at a location where the user needed see the view either through the viewfinder or on the camera LCD. That is, in conventional cameras, to obtain an image with a desired contents, the camera needs to be positioned somewhere where the user can look through the view finder or look at the LCD display. However, through the present invention, the camera may be held high with one hand, or placed on top of a wall, or otherwise positioned somewhere where the user cannot look through the view finder or look at the camera LCD display, and the VCU held and operated in the other hand.

The VCU 104 may cooperate with camera 102 in a variety of uses in alternative embodiments. The camera 102 may be positioned in an unobtrusive or hidden position, and then operated with VCU 104. A camera may be positioned somewhere not otherwise accessible to an operator (such as for example at off-limits to sporting, political and celebrity events), and operated with VCU 104 by an operator.

In embodiments described above, the VCU 104 may be a dedicated component for the use and operation described above. In a further embodiment described with respect to FIGS. 10-16, VCU 104 may in fact be a conventional device configured to operate in accordance with the principals of the present invention. For example, a mobile telephone or other computing device such as a computer or PDA may be loaded with software and/or hardware allowing the device to perform as a view and control unit having all of the functionality of VCU 104 described above. In a further alternative embodiment, another digital camera may be loaded with software and/or hardware to provide the second camera with a mode where the second camera acts not as a picture taking device, but as a VCU as described above. Each of these devices may be conventional devices, but configured with hardware and/or software to provide a mode, referred to herein as VCU mode, where the device operates as a view and control unit for a camera.

Figure 10:
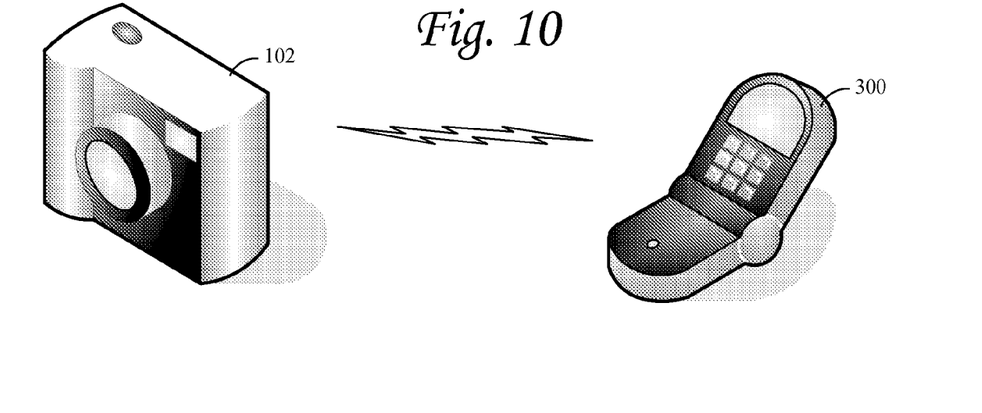
FIG. 10 is a view of a camera and handheld device configured as a view and control unit according to a further embodiment of the present invention.
Figure 11:
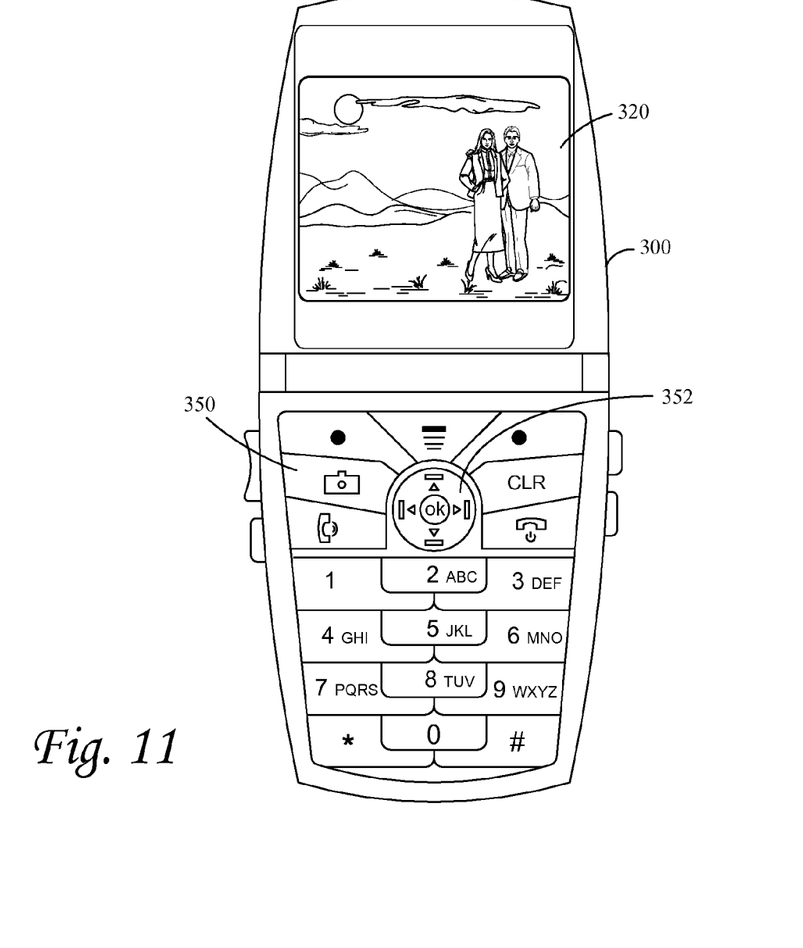
FIG. 11 is a front view of a mobile telephone for performing as a view and control unit according to an embodiment of the present invention.
Figure 12:
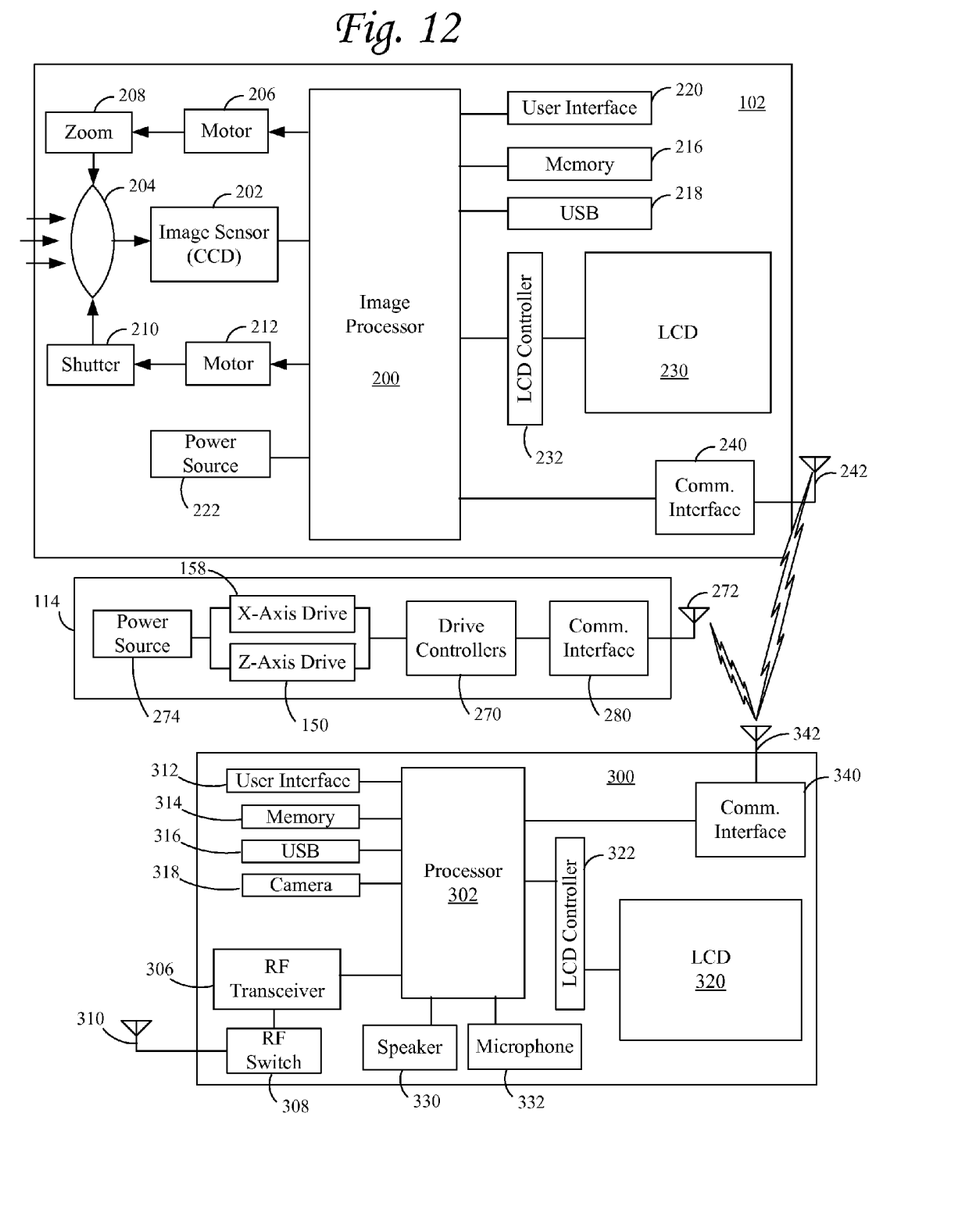
FIG. 12 is a block diagram of a camera and handheld device configured as a view and control unit according to a further embodiment of the present invention.

FIGS. 10 through 12 illustrate an embodiment where a mobile telephone 300 is configured to operate as a view and control unit sending and receiving signals to a camera 102 as described above. Telephone 300 may have a conventional hardware configuration and may operate to perform all of the functions conventionally known for mobile telephones. Additionally, as explained hereinafter, a software application program and other software components may be loaded onto telephone 300 to allow the telephone to act as a view and control unit in accordance with the present invention.

The components of a telephone 300 for use with the present invention are known. However, some of the components are shown in the block diagram of FIG. 12 and described hereinafter. FIG. 12 also shows a camera 102 and an actuation table 114, as described above, operating with telephone 300. The signals transmitted to and from camera 102 and actuation table 114 may be as described above.

Telephone 300 may include a processor 302, which may be part of or include a digital baseband and/or an analog baseband for handling digital and analog signals. As is known, processor 302 may include a variety of electronics for handling incoming and outgoing digital voice and data signals.

RF Transceiver 306 and switch 308 are provided for receiving and transmitting analog signals, such as an analog voice signal, via an antenna 310. In embodiments, transceiver 304 performs the quadrature modulation and demodulation, as well as up- and down-conversion from dual-band (800 and 1900 MHz) RF to baseband. The various communication interfaces described herein may include a transceiver and/or switch as in transceiver 306 and switch 308.

Telephone 300 may further include a user interface 312 including a variety of actuators in the form of buttons, dials, switches, etc. (an example shown in FIG. 11) for controlling telephone features and operation. When used in VCU mode, at least some of these buttons, dials, switches, etc. are assigned functions for controlling camera features and operation. In embodiments, the user interface may include buttons, dials, switches, etc. that are dedicated for use within VCU mode and serve no other function. The user interface 312 may include mechanisms for controlling most or all manner of camera features and operations, some of which have been described above with respect to user interface 248 on VCU 104.

Telephone 300 may further include memory 314, for storing telephone numbers, address, etc. Memory 314 may additionally store photographic or video images taken with the telephone 300, or with camera 102 when telephone 300 is operating in VCU mode. A variety of digital memory formats may be used for this purpose. In one embodiment, memory 314 may be a removable flash memory card, such as those manufactured by SanDisk Corporation of Sunnyvale, Calif. Formats for memory 314 include, but are not limited to: built-in memory, Smart Media cards, Compact Flash cards, Memory Sticks, floppy disks, hard disks, and writeable CDs and DVDs.

Telephone 300 may further include a connection 316 for connecting telephone 300 to another device. Connection 316 may be a USB connection, but it is understood that other types of connections may be provided, including serial, parallel, SCSI and an IEEE 1394 ("Firewire") connections.

Telephone 300 may further include a camera 318 as is known in the art. Camera 318 may have some, all and/or additional components than those described above with respect to camera 102. In the embodiments described with respect to FIGS. 10 through 12, telephone 300 is acting as a view and control unit for controlling a camera 102. However, as telephone 300 itself has a camera, in a further embodiment, a mobile telephone 300 may be used as a camera, which mobile telephone is controlled by a separate VCU 104. Instead of VCU 104 in such an embodiment, the telephone camera may instead be controlled by a second telephone 300, or other processing device configured with a VCU mode according to embodiments of the present invention. As used herein, the term "camera" may thus include a mobile telephone.

When telephone 300 is in its conventional camera mode, an image captured by a lens in the telephone is forwarded to processor 302 (or to some dedicated camera processor), which in turn displays that image on an LCD screen 320 in the telephone. An LCD controller interface 322 may be provided for receiving the signal from the processor 302 and interpreting it for display on LCD 320. LCD 320 and LCD controller 322 may be of known construction. The LCD controller interface 322 may be part of processor 302 in embodiments.

Telephone 300 may include a speaker 330 of known construction for reproducing voice signals, as well as for outputting various ring tones, interactive voice menus and other stored or received audio files. A microphone 332 of known construction may further be provided for receiving voice signals.

Telephone 300 may further include a communication interface 340 capable of wireless communication with communication interface 240 on camera 102 and communication interface 280 on actuation table 114, via an antenna 342. A conventional telephone 300 may include a communication interface 340 operating according to various wireless protocols, including Bluetooth, RF and IR.

Actuation of various buttons, dials, etc. on telephone user interface shown in FIG. 11 (explained in greater detail below) generates signals that are sent to the digital processor 302, which in turn forwards those signals to image processor 200 in camera 102 via the communications interfaces 340 and 240. Similarly, in embodiments operating with an actuation table 114, actuation of various buttons, dials, etc. on telephone user interface shown in FIG. 11 generates signals that are sent to the digital processor, which in turn forwards those signals to the drive controller(s) 270 in actuation table 114 via the communications interfaces 340 and 280.

Moreover, communications interface 340 may send and receive transmissions to/from components other than camera 102 and actuation table 114 in embodiments of the invention. For example, the telephone (when in VCU mode or otherwise) may communicate with a host computer to transfer data, such as photographic and video images, as well as software such as application programs, APIs, updates, patches, etc. Communications interface 340 may also be used to communicate with other devices, such as hand-held computing devices including hand-held computers, PDAs, other mobile telephones, digital cameras and view and control units 104 according to embodiments of the invention. Communications interface 340 may be used to connect telephone 300, and camera 102, to a variety of networks, including local area networks (LANs), wide area networks (WANs) and the Internet.

Thus, in embodiments of the invention, a photographic or video image may be taken with camera 102, and immediately thereafter sent via the telephone 300 to a remote processing device, website, email account or other network location. Text may also be sent via the keypad of the user interface 312.

It is understood that telephone 300 may have a variety of other configurations and additional or alternative components in alternative embodiments of the invention.

Figure 13:
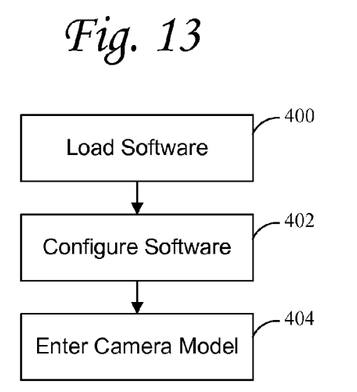
FIG. 13 is a block diagram for loading software to configure a hand-held device as a view and control unit.

Configuring telephone 300 to include a VCU mode will now be explained with reference to the flowchart of FIG. 13. Using components conventionally provided in telephone 300, telephone 300 may be configured to include a VCU mode for communicating with and controlling camera 102. In step 400, software enabling the VCU mode in telephone 300 is loaded in telephone 300. The software may be loaded onto telephone 300 by a variety of known methods. The software may be downloaded wirelessly via communication interface 340 or RF transceiver 306. Wireless downloading of software to telephone 300 is well known. For example, the software may be downloaded after the user dials an access telephone number. Software may alternatively be loaded from a storage medium, for example via connection 316. As a further alternative, the software may be programmed into ROM in the initial configuration of telephone 300. The software may be stored in memory 314, or some other memory associated with processor 302. As an alternative or in addition to loading software onto telephone 300, hardware such as an integrated circuit chip may be loaded into telephone 300 to provide telephone 300 with a VCU mode in accordance with the present invention.

Once the software and/or hardware are loaded onto telephone 300, no further configuration may be required to operate in VCU mode. Alternatively, the telephone may present a menu on the user interface 312 giving the user various options for configuring the operation of telephone 300 in VCU mode in step 402. Such configuration may allow the user to select which keys perform the various functions of the VCU mode. A user may also be prompted in step 404 to enter the camera model as part of the configuration process or thereafter. Certain aspects of the software may be customized for different cameras. The camera model may also be asked for earlier in the process, such as before or during the loading of the software and/or hardware onto the telephone 300.

Figure 14:
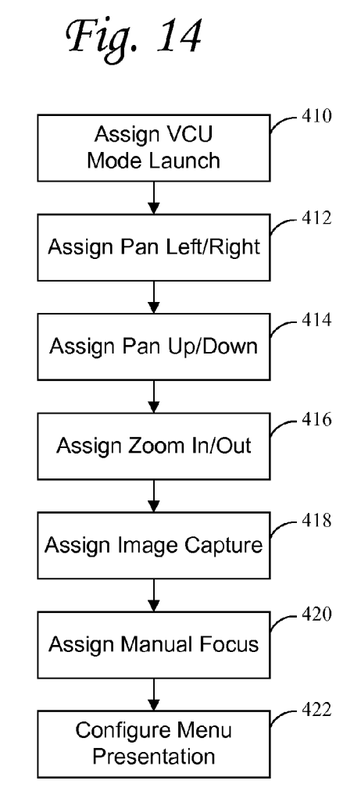
FIG. 14 is block diagram of the software operation according to embodiments of the present invention.

Once loaded, the software/hardware enables the VCU mode as explained with respect to FIG. 14. The software assigns a key on user interface 312 for launching the VCU mode in step 410. Referring to an example of telephone 300 shown in FIG. 11, a camera key 350 is conventionally provided to enter the telephone camera mode. The software/hardware may configure telephone 300 such that pressing camera key 350 once enters the telephone camera mode, but pressing the camera key 350 twice (or a predetermined number of times), launches the VCU mode. Other keys may be assigned to launch the VCU mode.

The software/hardware further assigns keys for sending signals to the actuation table 114 to pan left and right (step 412) and pan up and down (step 414) when in VCU mode. For example, the left/right and up/down arrows of circular key 352 may be used to accomplish the left/right and up/down actuation of actuation table 114 and camera 102. Other key assignments are possible for performing these functions. Similarly, the software assigns keys for sending signals to the camera 102 to zoom in and out (step 416) and for capturing an image (step 418). The software further configures menu items which may be presented when a menu in the VCU mode is selected. A variety of other key assignments may be made for performing other camera functions in the VCU mode. It is understood that the assignment of keys when in VCU mode as described above may occur when the software/hardware is loaded onto telephone 300, or when the VCU mode is launched (though the assignment of the VCU mode launch key would need to occur before VCU mode is launched).

Figure 15:
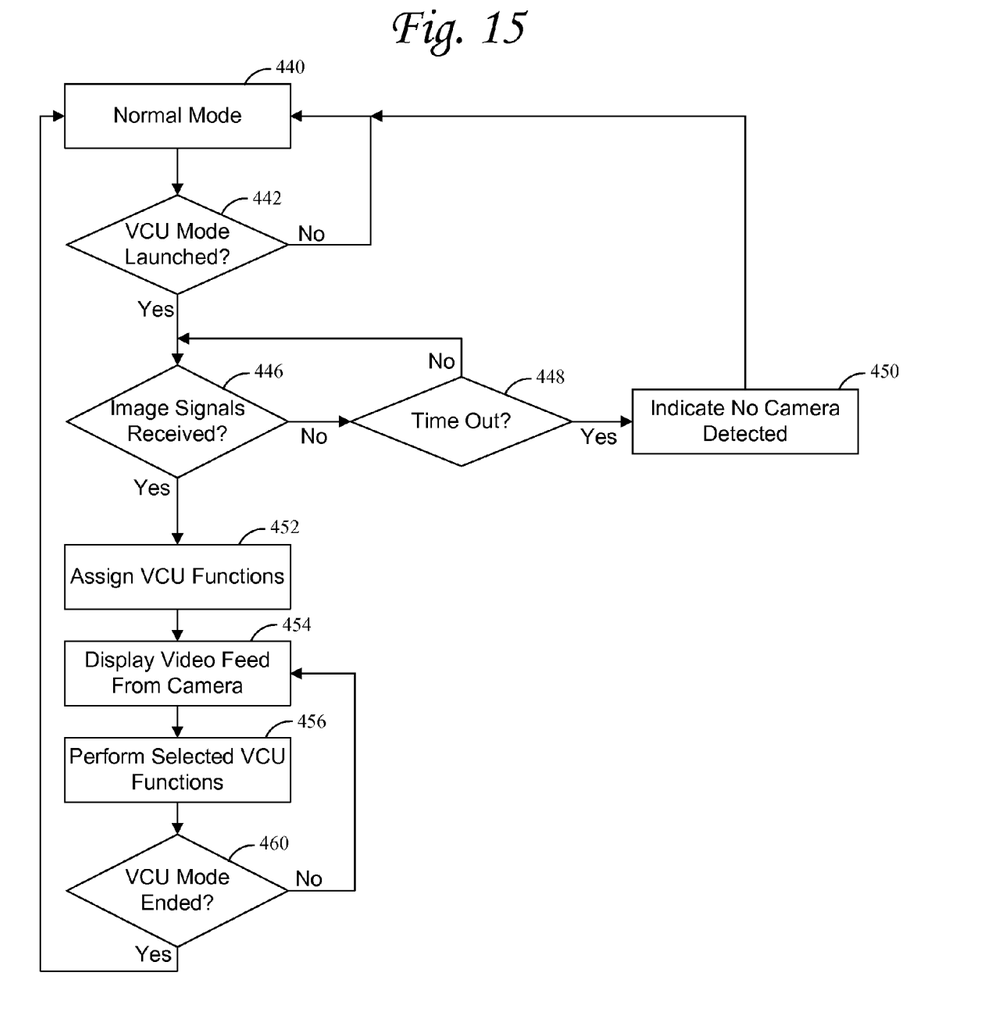
FIG. 15 is a block diagram of the operation of a telephone including a view and control mode according to an embodiment of the present invention.

Operation of telephone 300 will now be explained with respect to FIG. 15. Those of skill in the art would appreciate that at least some of the steps shown in FIG. 15 would also apply to operation of VCU 104 described above. The normal mode, indicated by step 440, may be any of the various modes or functions telephone 300 may perform when not in VCU mode. These modes include conversing with others, sending text messages, accessing the Internet, accessing stored contact information, etc. The software first checks for launching of the VCU mode in step 442. If no VCU mode is detected, the software returns to step 440 and continues to operate in normal mode.

If the VCU mode has been launched, the software determines whether image signals have been received from camera 102 in step 446. The processor 302 may include an internal clock, and the software may have a predetermined period of time to detect an image signal from camera 102 after launch of the VCU mode. If no signal is detected in step 446, and the predetermined period of time has not yet expired in step 448, the software returns to step 446 to see if a signal is detected. If no signal is detected in step 446, and the predetermined period of time has expired in step 448, the software displays a message in step 450, for example on LCD 320, that no camera has been detected. The software then returns telephone 300 to normal operation in step 440.

If the software detects receipt of the image signal in step 446, the software assigns the various key functions for VCU mode in step 452. If the assignments are already made, the assignments are enabled in step 452. In step 454, the digital processor switches the image feed supplied to LCD 320 from the telephone camera to the image signal received from camera 102. Thus, as shown in FIG. 11, the telephone LCD 320 would display the image seen by camera 102. In step 456, the software then performs the one or more functions selected by the user for controlling camera 102 and taking a picture with camera 102 as described above. In step 460, the software checks whether telephone 300 is still being used in VCU mode. If not, the software returns to normal mode (step 440). Otherwise, the software continues to display the image feed from camera 102 (step 454) and performs additional VCU mode functions selected by a user (step 456).

Figure 16:
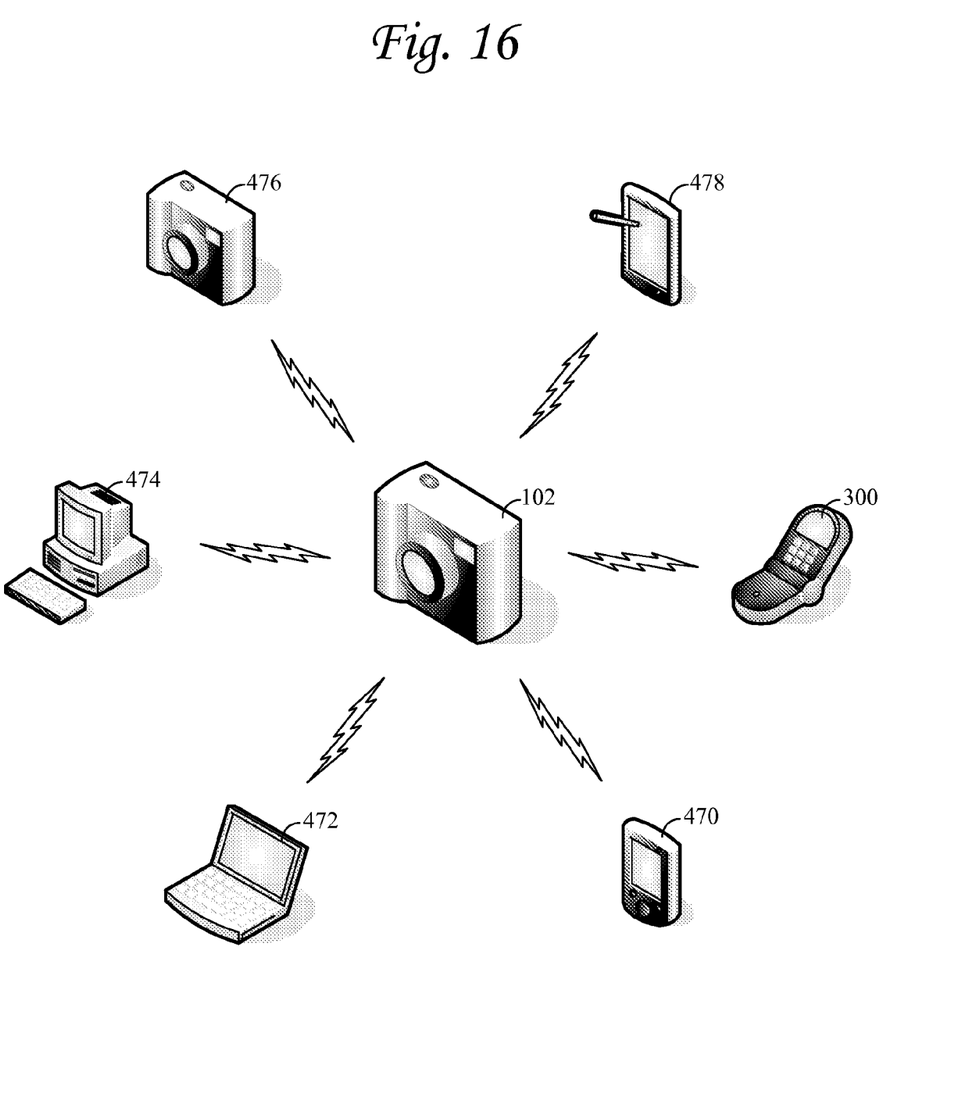
FIG. 16 is a diagram of a camera and several devices which may be configured to operate as a view and control unit according to embodiments of the present invention.

One embodiment of a telephone 300 for performing according to the present invention is shown in FIGS. 10 through 12. However, it is understood that any number of other devices may be used for viewing an image seen by camera 102 and for controlling the image. Such devices may include a communications interface (wireless or otherwise) and a method for displaying an image seen by the camera. FIG. 16 is an illustration of a camera 102 connected to a variety of devices, including telephone 300, PDA (or hand-held computer) 470, laptop computer 472, desktop computer 474, another camera 476 and tablet computer 478. In embodiments, the camera 102 would be connected to one of these devices. However, in alternative embodiments, the camera 102 may be connected to two or more of the devices shown in FIG. 16, or multiple ones of the devices shown in FIG. 16. Other devices are contemplated. When camera 102 is connected to a second camera 476 capable of operating in VCU mode, the second camera 476 may be the same as or different than the camera 102. When the same, the operation of camera 476 in VCU mode may be the same as normal operation of the camera 476, except that operation of the various features of camera 476 controls operation of the various corresponding functions in camera 102.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the claims to be added hereinafter.

I claim:

1. A method implemented on a hand-held mobile device for controlling a camera, comprising the steps of:
    (a) receiving, via a short range wireless signal, an image signal from the camera relating to an image received within a lens of the camera;
    (b) communicating, via a short range wireless signal, a first instruction to the camera to change an image generated by the camera; and
    (c) communicating, via a short range wireless signal, a second instruction to the camera to store an image displayed on a display of the hand-held mobile device.

2. The method of claim 1, wherein said step (a) comprises the step of receiving the image signal via one of the Bluetooth, Wireless USB, 802.11, short range radio frequency and infrared wireless protocols.

3. The method of claim 1, wherein said step (b) comprises the step of communicating an instruction to the camera to pan left, right, up or down.

4. The method of claim 1, wherein said step (b) comprises the step of communicating an instruction to the camera to zoom in or out.

5. The method of claim 1, wherein the hand-held mobile device is a mobile telephone, the method further comprising the step of assigning a function to one or more of the keys of the phone for the one or more keys of the phone to perform one of steps (b) or (c) when actuated.

6. One or more processor readable storage devices having processor readable code embodied on said processor readable storage devices, said processor readable code for programming one or more processors of a hand-held mobile device to perform a method comprising the steps of:
    (a) receiving, via a short range wireless signal, an image signal from a camera relating to an image received within a lens of the camera;
    (b) communicating, via a short range wireless signal, a first instruction to the camera to change an image generated by the camera; and
    (c) communicating, via a short range wireless signal, a second instruction to the camera to capture an image displayed on a display of the hand-held mobile device.

7. The method of claim 6, wherein said steps (b) and (c) comprise the steps of communicating via one of the Bluetooth, Wireless USB, 802.11, short range radio frequency and infrared wireless protocols.

8. The method of claim 6, wherein said step (b) comprises the step of communicating an instruction to the camera to pan left, right, up or down.

9. The method of claim 6, wherein said step (b) comprises the step of communicating an instruction to the camera to zoom in or out.

10. The method of claim 6, wherein the hand-held mobile device is a mobile telephone, the method further comprising the step of assigning a function to one or more of the keys of the phone for the one or more keys of the phone to perform one of steps (b) or (c) when actuated.

11. The method of claim 6, wherein the hand-held mobile device is a mobile telephone, the method further comprising the step of assigning a function to one or more of the keys of the phone for the one or more keys of the phone to perform one of steps (c) or (d) when actuated.

12. One or more processor readable storage devices having processor readable code embodied on said processor readable storage devices, said processor readable code for programming one or more processors of a hand-held mobile device to perform a method comprising the steps of:
    (a) receiving, via a short range wireless signal, an image signal from a camera relating to an image received within a lens of the camera;
    (b) displaying an image generated from the image signal on a display of the hand-held mobile device;
    (c) communicating, via a short range wireless signal, an instruction to the camera to perform at least one of the steps of panning left, right, up or down and zooming in or out, based on the image displayed in said step (b) on the display of the hand-held mobile device; and
    (d) communicating, via a short range wireless signal, a second instruction to the camera to store an image displayed on a display of the hand-held mobile device.

13. The method of claim 12, wherein said step (a) comprises the step of receiving a video signal.

14. The method of claim 13, wherein said step (b) comprises displaying on the display of the hand-held mobile device a video representing what is received within the lens of the camera.

15. The method of claim 12, wherein said steps (c) and (d) comprise the steps of communicating via one of the Bluetooth, Wireless USB, 802.11, short range radio frequency and infrared wireless protocols.

* * * * *